United States Patent
McConnochie et al.

(10) Patent No.: US 7,843,814 B2
(45) Date of Patent: Nov. 30, 2010

(54) MECHANISM AND METHOD FOR NON-SERVICE AFFECTING APS PROTECTION FOR MLPPP BUNDLES ON ROUTING SYSTEMS

(75) Inventors: William McConnochie, Nepean (CA); Andrew Dolganow, Kanata (CA); Vinod Prabhu, Kanata (CA)

(73) Assignee: Alcatel Lucent, Paris (FR)

(*) Notice: Subject to any disclaimer, the term of this patent is extended or adjusted under 35 U.S.C. 154(b) by 293 days.

(21) Appl. No.: 11/902,710

(22) Filed: Sep. 25, 2007

(65) Prior Publication Data
US 2009/0080327 A1   Mar. 26, 2009

(51) Int. Cl.
*H04J 1/16*   (2006.01)

(52) U.S. Cl. .................. 370/228; 370/216; 370/225

(58) Field of Classification Search .......... 370/216–228
See application file for complete search history.

(56) References Cited

U.S. PATENT DOCUMENTS

| | | | |
|---|---|---|---|
| 5,619,653 A * | 4/1997 | Kawauchi | 709/213 |
| 2001/0056503 A1 * | 12/2001 | Hibbard | 709/250 |
| 2004/0100899 A1 | 5/2004 | Mahamuni | |
| 2005/0102603 A1 * | 5/2005 | Tapper et al. | 714/770 |
| 2007/0153828 A1 * | 7/2007 | Vishnubhatla et al. | 370/468 |

FOREIGN PATENT DOCUMENTS

| | | |
|---|---|---|
| AU | 2003276499 A1 | 6/2004 |
| WO | WO 2004/049609 | 6/2004 |

OTHER PUBLICATIONS (Wiki—PPP.pdf) Wikipedia. Point-to-Point Protocol. Sep. 15, 2006. <http://web.archive.org/web/20060915084110/http://en.wikipedia.org/wiki/Point-to-Point_Protocol>.*
(Wiki—MAC.pdf) Wikipedia. MAC address. Sep. 4, 2006. <http://web.archive.org/web/20060904001354/http://en.wikipedia.org/wiki/MAC_address>.*

* cited by examiner

*Primary Examiner*—William Trost, IV
*Assistant Examiner*—Ashil Farahmand
(74) *Attorney, Agent, or Firm*—Kramer & Amado P.C.

(57) ABSTRACT

A method of non-service affecting APS protection for MLPPP bundles on routing systems, and associated mechanism, including one or more of the following: specifying a working MLPPP bundle and a protection MLPPP bundle; specifying MLPPP parameters; associating the working MLPPP bundle and the protection MLPPP bundle with an APS circuit; bringing up an MLPPP session; changing an operational status of the working MLPPP bundle; synchronizing MLPPP state information between the working MLPPP bundle and the protection MLPPP bundle; and driving an operational status of the protection MLPPP bundle based on said changing the operational status of the working MLPPP bundle.

15 Claims, 2 Drawing Sheets

MECHANISM AND METHOD FOR NON-SERVICE AFFECTING APS PROTECTION FOR MLPPP BUNDLES ON ROUTING SYSTEMS

BACKGROUND OF THE INVENTION

1. Field of the Invention

This invention relates generally to the use of systems and methods relating to failure detection in routers.

2. Description of Related Art

One approach to failure detection in routers is known as automatic protection switching (APS). Many APS systems using multiple line PPP (MLPPP) result in data loss during an APS switch when used by MLPPP. This data loss is undesirable. Thus, there is a need for a mechanism and method that prevents data loss during an APS switch.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for a mechanism and method for non-service affecting APS protection for MLPPP bundles on routing systems, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

In various exemplary embodiments, APS is implemented in routers as a detection mechanism only. Typically, in such embodiments, when a failure is detected, an APS switchover is initiated on a physical layer. MLPPP bundles residing on an old active circuit go down and MLPPP bundles residing on a newly active APS circuit are brought up. However, bringing MLPPP bundles down and up in routers during an APS switch is believed to typically result in a data outage. As stated above, this data outage is generally undesirable.

APS protection on routers is different than APS protection in optical equipment or L2 (ATM for example) switches. In APS protection for optical equipment or L2 switches, an APS switchover does not usually affect MLPPP bundles.

One reason for the difference in APS protection on routers versus optical equipment or L2 switches is believed to be that routers commonly allow more distributed protection. One example of more distributed protection is where one router protects another router.

Another reason for the difference in APS protection on routers versus optical equipment or L2 switches is believed to be that routers are not typically capable of transmitting data on both working and protection circuits. The ability to transmit data on both working and protection circuits is believed to be a factor beneficial to keeping both MLPPP state machines up. Accordingly, various exemplary embodiments enable routers to transmit data on both working and protection circuits.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
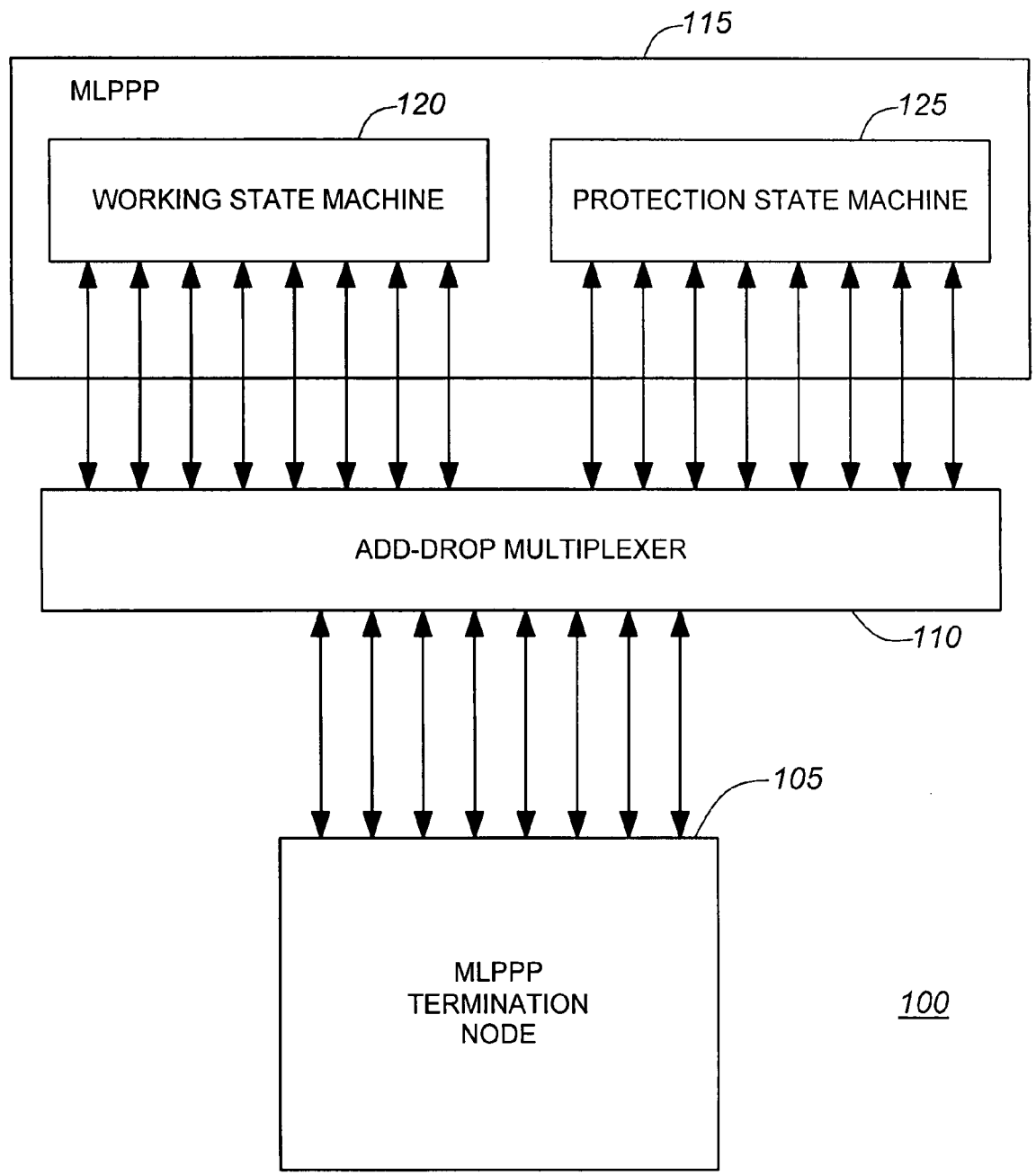
FIG. 1 is a schematic diagram of an exemplary embodiment of a mechanism for non-service affecting APS protection for MLPPP bundles on routing systems.

Referring now to the drawings, in which like numerals refer to like components or steps, there are disclosed broad aspects of various exemplary embodiments.

FIG. 1 is a schematic diagram of an exemplary embodiment of a mechanism for non-service affecting APS protection for MLPPP bundles on routing systems. Exemplary mechanism 100 includes an MLPPP termination node 105, and add-drop multiplexer 110 and an MLPPP 115. The MLPPP 115 includes a working state machine 120 and a protection state machine 125.

The MLPPP termination node 105 communicates with the add-drop multiplexer 110 along eight lines in the depicted embodiment. These eight lines or links are represented in exemplary mechanism 100 as arrows leading from the MLPPP termination node 105 to the add-drop multiplexer 110. The mechanism 100 is designed for an implementation where it is undesirable for the links of communication to go down.

It should be apparent that various exemplary embodiments use any number of lines or links other than eight. This is true of all references herein to eight lines or links.

The add-drop multiplexer 110 also communicates with the working state machine 120 through eight lines or links in the depicted embodiment. The add-drop multiplexer 110 likewise communicates with the protection state machine 125 through eight lines or links in the depicted embodiment.

The eight communication lines or links from the add-drop multiplexer 110 to the working state machine 120 are illustrated in exemplary mechanism 100 by eight arrows from the add-drop multiplexer 110 to the working state machine 120. Similarly, the eight communication lines or links from the add-drop multiplexer 110 to the protection state machine 125 are illustrated in exemplary mechanism 100 by eight arrows from the add-drop multiplexer 110 to the protection state machine 125.

The eight links from the add-drop multiplexer 110 to the working state machine 120 correspond to the eight links from the MLPPP termination node 105 to the add-drop multiplexer 110. Likewise, the eight links from the add-drop multiplexer 110 to the protection state machine 125 correspond to the eight links from the MLPPP termination node 105 to the add-drop multiplexer 110.

Accordingly, the eight links from the add-drop multiplexer 110 to the working state machine 120 and the eight links from the add-drop multiplexer 110 to the protection state machine 125 represent duplicative lines of communication between the add-drop multiplexer 110 and the MLPPP 115. By virtue of this redundancy, the protection state machine 125 functions as a backup for the working state machine 120 such that a line of communication can be switched to the protection state machine 125 when a corresponding link between the add-drop multiplexer 110 and the working state machine 120 goes down or a switchover is requested, as, for example, by external stimuli. Accordingly, after such a switch, the roles of the protection state machine 125 and the working state machine 120 are reversed in various exemplary embodiments while the line of communication that went down between the add-drop multiplexer 110 and the working state machine 120 is repaired. Other aspects of the various elements depicted in FIG. 1 will be described below in connection with FIG. 2.

Figure 2:
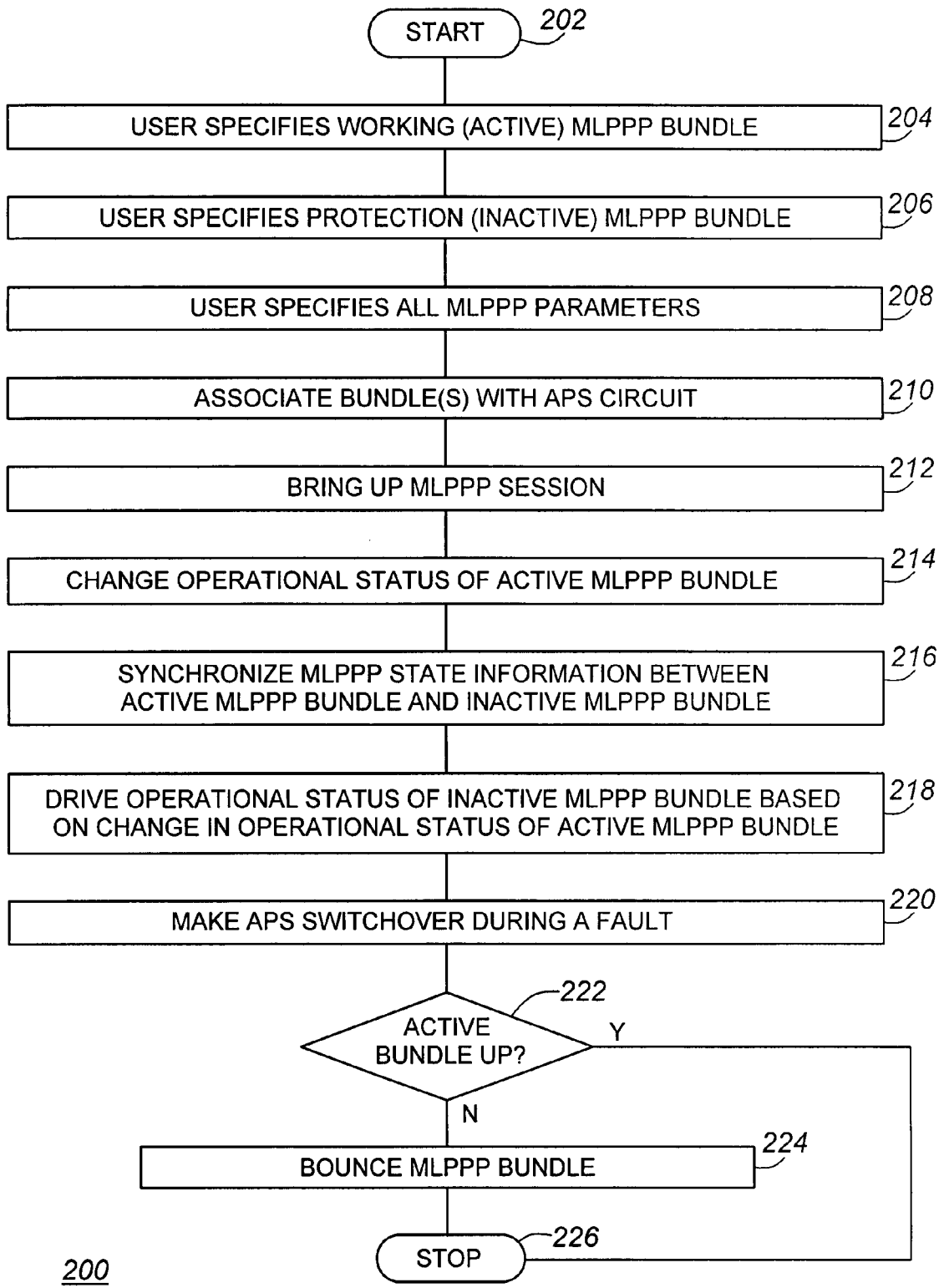
FIG. 2 is a flow chart of an exemplary method of non-service affecting APS protection for MLPPP bundles on routing systems.

FIG. 2 is a flow chart of an exemplary method of non-service affecting APS protection for MLPPP bundles on routing systems. The method 200 starts in step 202 and proceeds to step 204.

In step 204, a user specifies a working or active MLPPP bundle. Following step 204, the method 200 proceeds to step 206. In step 206, a user specifies a protection or inactive MLPPP bundle. In various exemplary embodiments, the working bundle and the protection bundle are joined together as one master bundle. In various exemplary embodiments, the working MLPPP bundle resides on a working APS circuit for an APS protected MLPPP bundle. Similarly, in various exemplary embodiments, the protection MLPPP bundle resides on a protection APS circuit for an APS protected MLPPP bundle.

Following step 206, the method 200 proceeds to step 208. In step 208, all MLPPP parameters are specified. In various exemplary embodiments, a user specifies the MLPPP parameters in step 208. In various exemplary embodiments, the MLPPP parameters are specified separately for each MLPPP bundle. In other exemplary embodiments, the MLPPP parameters are only specified for a master bundle.

Following step 208, the method 200 proceeds to step 210. In step 210, the MLPPP bundle or bundles are associated with an APS circuit. Following step 210, the method 200 proceeds to step 212.

In step 212; an MLPPP session is brought up and begun. Following step 212, the method 200 proceeds to step 214.

In step 214, an operational status of the active MLPPP bundle is changed. Following step 214, the method 200 proceeds to step 216.

In step 216, MLPPP state information is synchronized between the active MLPPP bundle and the inactive MLPPP bundle. In various exemplary embodiments, a benefit of the synchronization that occurs in step 216 is that the synchronization enables the MLPPP bundle to remain up.

In various exemplary embodiments, the state information synchronized between the bundles in step 216 includes an identification of an endpoint discriminator. In various exemplary embodiments, the state information synchronized between bundles in step 216 includes a state of the active MLPPP bundle finite state machine (FSM).

Following step 216, the method 200 proceeds to step 218. In step 218, the operational status of the inactive MLPPP bundle is driven based on the change in the operational status of the active MLPPP bundle that occurred in step 214. Thus, step 218 is entirely separate and distinct from embodiments where messages are exchanged by the inactive MLPPP FSM itself. In various exemplary embodiments, the functions performed in step 218 enable a newly active MLPPP bundle to remain up on an APS switchover when it was up at the time of the switchover.

Following step 218, the method 200 proceeds to step 220. In step 220 an APS switchover is made during a fault. In various exemplary embodiments, step 220 further includes restarting the FSM if the FSM was down.

Following step 220, the method 200 proceeds to step 222. In step 222 an evaluation is made whether the active bundle is up. When a determination is made in step 222 that the active bundle is up, the method 200 proceeds to step 226 where the method 200 stops.

Alternatively, when a determination is made in step 222 that the active bundle is not up, the method 200 proceeds to step 224. In step 224, the MLPPP bundle is bounced. In other words, in step 224 an attempt is made to reset the MLPPP bundle. Following step 224, the method 200 proceeds to step 226 where the method stops.

According to the foregoing, various exemplary embodiments minimize service outage during an APS switchover for APS-protected MLPPP bundles. Likewise, various exemplary embodiments provide increased redundancy for MLPPP in a network. Further, various exemplary embodiments allow for deployment of more strict applications that do not tolerate outages well. This is true because various exemplary embodiments overcome the lack of tolerance for outages in certain strict applications.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A method of non-service affecting APS protection for MLPPP bundles on routing systems, comprising:
   specifying a working MLPPP bundle;
   specifying a protection MLPPP bundle;
   specifying MLPPP parameters;
   associating the working MLPPP bundle and the protection MLPPP bundle with an APS circuit;
   bringing up an MLPPP session;
   changing an operational status of the working MLPPP bundle;
   synchronizing MLPPP state information between the working MLPPP bundle and the protection MLPPP bundle using duplicative lines of communication between an add-drop multiplexer and the working and protection MLPPP bundles; and
   driving an operational status of the protection MLPPP bundle based on said changing the operational status of the working MLPPP bundle.

2. The method of non-service affecting APS protection for MLPPP bundles on routing systems, according to claim 1, further comprising:
   making an APS switchover during a fault.

3. The method of non-service affecting APS protection for MLPPP bundles on routing systems, according to claim 2, further comprising:
   determining that the working MLPPP bundle is not up.

4. The method of non-service affecting APS protection for MLPPP bundles on routing systems, according to claim 3, further comprising:
   bouncing the working MLPPP bundle.

5. The method of non-service affecting APS protection for MLPPP bundles on routing systems, according to claim 1, wherein the working MLPPP bundle is specified by a user and the protection MLPPP bundle is specified by a user.

6. The method of non-service affecting APS protection for MLPPP bundles on routing systems, according to claim 1, wherein the MLPPP parameters are specified by a user.

7. The method of non-service affecting APS protection for MLPPP bundles on routing systems, according to claim 1, wherein the MLPPP parameters are specified separately for the working MLPPP bundle and the protection MLPPP bundle.

8. The method of non-service affecting APS protection for MLPPP bundles on routing systems, according to claim 1, wherein the MLPPP state information includes an identification of an endpoint discriminator.

9. The method of non-service affecting APS protection for MLPPP bundles on routing systems, according to claim 1, wherein the MLPPP state information includes a state of a finite state machine of the working MLPPP bundle.

10. The method of non-service affecting APS protection for MLPPP bundles on routing systems, according to claim 1, wherein driving the operational status of the protection MLPPP bundle based on said changing the operational status of the working MLPPP bundle enables a newly active MLPPP bundle to remain up on an APS switchover.

11. The method of non-service affecting APS protection for MLPPP bundles on routing systems, according to claim 1, further comprising:
    restarting a finite state machine that was down during a fault.

12. The method of non-service affecting APS protection for MLPPP bundles on routing systems, according to claim 1, wherein no data is lost during an APS switchover.

13. The method of non-service affecting APS protection for MLPPP bundles on routing systems, according to claim 1, wherein data is transmitted on the working MLPPP bundle and the protection MLPPP bundle.

14. A mechanism for non-service affecting APS protection for MLPPP bundles on routing systems, comprising:
    an MLPPP termination node;
    an add-drop multiplexer;
    a working state machine that is active;
    a protection state machine that duplicates the working state machine and is inactive;
    a plurality of communication links between the MLPPP termination node and the add-drop multiplexer;
    a plurality of communication links between the add-drop multiplexer and the working state machine; and
    a plurality of communication links between the add-drop multiplexer and the protection state machine, that duplicate the plurality of communication links between the add-drop multiplexer and the working state machine and synchronize MLPPP state information between the working state machine and the protection state machine, wherein no data is lost during an APS switchover and the MLPPP bundles remain up during the APS switchover.

15. The mechanism for non-service affecting APS protection for MLPPP bundles on routing systems, according to claim 14, wherein a number of the communication links between the MLPPP termination node and the add-drop multiplexer, a number of the plurality of communication links between the add-drop multiplexer and the working state machine, and a number of the plurality of communication links between the add-drop multiplexer and the protection state machine is the same number.

\* \* \* \* \*